US 9,170,107 B2

(12) United States Patent
Anac et al.

(10) Patent No.: US 9,170,107 B2
(45) Date of Patent: Oct. 27, 2015

(54) MICROMACHINED GYROSCOPE INCLUDING A GUIDED MASS SYSTEM

(71) Applicant: InvenSense, Inc., San Jose, CA (US)

(72) Inventors: Ozan Anac, Sunnyvale, CA (US); Joseph Seeger, Menlo Park, CA (US)

(73) Assignee: INVENSENSE, INC., San Jose, CA (US)

( * ) Notice: Subject to any disclaimer, the term of this patent is extended or adjusted under 35 U.S.C. 154(b) by 98 days.

(21) Appl. No.: 14/041,810

(22) Filed: Sep. 30, 2013

(65) Prior Publication Data

US 2014/0026662 A1 Jan. 30, 2014

Related U.S. Application Data

(63) Continuation-in-part of application No. 13/235,296, filed on Sep. 16, 2011, now Pat. No. 8,833,162.

(51) Int. Cl.
*G01C 19/56* (2012.01)
*G01C 19/574* (2012.01)
*G01C 19/5712* (2012.01)

(52) U.S. Cl.
CPC .............. *G01C 19/56* (2013.01); *G01C 19/574* (2013.01); *G01C 19/5712* (2013.01)

(58) Field of Classification Search
CPC .. G01C 19/56; G01C 19/574; G01C 19/5733; G01C 19/5755
USPC ............... 73/504.02, 504.04, 504.12, 504.14, 73/510, 511
See application file for complete search history.

(56) References Cited

U.S. PATENT DOCUMENTS

| 4,510,802 | A |   | 4/1985  | Peters           |           |
|-----------|---|---|---------|------------------|-----------|
| 5,349,855 | A |   | 9/1994  | Bernstein et al. |           |
| 5,481,914 | A | * | 1/1996  | Ward             | 73/504.16 |
| 5,895,850 | A | * | 4/1999  | Buestgens        | 73/504.12 |
| 5,992,233 | A | * | 11/1999 | Clark            | 73/514.35 |
| 6,067,858 | A | * | 5/2000  | Clark et al.     | 73/504.16 |
| 6,230,563 | B1| * | 5/2001  | Clark et al.     | 73/504.04 |
| 6,250,156 | B1| * | 6/2001  | Seshia et al.    | 73/504.12 |
| 6,508,122 | B1| * | 1/2003  | McCall et al.    | 73/504.12 |
| 6,520,017 | B1| * | 2/2003  | Schoefthaler et al. | 73/514.02 |

(Continued)

FOREIGN PATENT DOCUMENTS

CN        1782713 A       6/2006
WO    WO 2009/130554     10/2009

OTHER PUBLICATIONS

International Search Report and Written Opinion for International Application No. PCT/US2012/054411, mailed Dec. 24, 2012.

*Primary Examiner* — Laura Martin
*Assistant Examiner* — Samir M Shah
(74) *Attorney, Agent, or Firm* — Sawyer Law Group, P.C.

(57) ABSTRACT

A gyroscope comprises a substrate and a guided mass system. The guided mass system comprises proof masses and guiding arms disposed in a plane parallel to the substrate. The proof masses are coupled to the guiding arm by springs. The guiding arm is coupled to the substrate by springs. At least one of the proof-masses is directly coupled to the substrate by at least one anchor via a spring system. The gyroscope also comprises an actuator for vibrating one of the proof-masses in the first direction, which causes another proof mass to rotate in the plane. Finally, the gyroscope also includes transducers for sensing motion of the guided mass system in response to angular velocities about a single axis or multiple input axes.

26 Claims, 10 Drawing Sheets

(56) References Cited

U.S. PATENT DOCUMENTS

| | | | |
|---|---|---|---|
| 6,845,669 B2* | 1/2005 | Acar et al. | 73/504.14 |
| 6,892,575 B2* | 5/2005 | Nasiri et al. | 73/504.12 |
| 6,939,473 B2* | 9/2005 | Nasiri et al. | 216/2 |
| 7,036,372 B2* | 5/2006 | Chojnacki et al. | 73/504.12 |
| 7,250,112 B2* | 7/2007 | Nasiri et al. | 216/2 |
| 7,284,430 B2* | 10/2007 | Acar et al. | 73/504.12 |
| 7,437,933 B2* | 10/2008 | Durante et al. | 73/504.15 |
| 7,458,263 B2* | 12/2008 | Nasiri et al. | 73/504.12 |
| 8,042,394 B2* | 10/2011 | Coronato et al. | 73/504.04 |
| 8,042,396 B2* | 10/2011 | Coronato et al. | 73/504.12 |
| 8,069,726 B2* | 12/2011 | Seeger et al. | 73/504.12 |
| 8,141,424 B2* | 3/2012 | Seeger et al. | 73/504.12 |
| 8,322,213 B2* | 12/2012 | Trusov et al. | 73/504.12 |
| 8,539,835 B2* | 9/2013 | Seeger et al. | 73/504.12 |
| 2004/0211258 A1 | 10/2004 | Geen | |
| 2005/0066728 A1* | 3/2005 | Chojnacki et al. | 73/514.16 |
| 2005/0072231 A1* | 4/2005 | Chojnacki et al. | 73/504.14 |
| 2005/0081631 A1 | 4/2005 | Weinberg et al. | |
| 2005/0081633 A1* | 4/2005 | Nasiri et al. | 73/514.29 |
| 2005/0199061 A1* | 9/2005 | Acar et al. | 73/504.02 |
| 2006/0070441 A1* | 4/2006 | Durante et al. | 73/504.12 |
| 2006/0112764 A1 | 6/2006 | Higuchi | |
| 2006/0219006 A1* | 10/2006 | Nasiri et al. | 73/504.12 |
| 2007/0214883 A1* | 9/2007 | Durante et al. | 73/504.04 |
| 2007/0240508 A1* | 10/2007 | Watson | 73/504.12 |
| 2008/0115579 A1* | 5/2008 | Seeger et al. | 73/504.12 |
| 2009/0064780 A1* | 3/2009 | Coronato et al. | 73/504.08 |
| 2009/0114016 A1* | 5/2009 | Nasiri et al. | 73/504.12 |
| 2009/0260437 A1 | 10/2009 | Blomqvist | |
| 2010/0071467 A1 | 3/2010 | Nasiri et al. | |
| 2010/0199764 A1 | 8/2010 | Hammer | |
| 2010/0218605 A1 | 9/2010 | Blomqvist et al. | |
| 2010/0222998 A1 | 9/2010 | Blomqvist | |
| 2011/0061460 A1* | 3/2011 | Seeger et al. | 73/504.12 |
| 2013/0068018 A1 | 3/2013 | Seeger et al. | |
| 2013/0086985 A1 | 4/2013 | Lin | |
| 2013/0239686 A1 | 9/2013 | Cazzaniga et al. | |

* cited by examiner

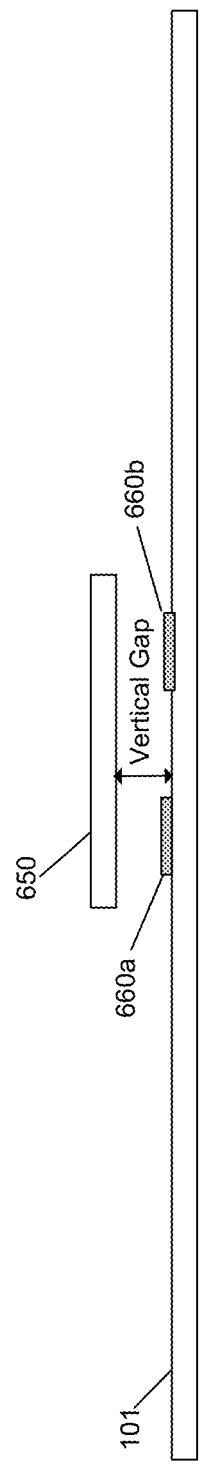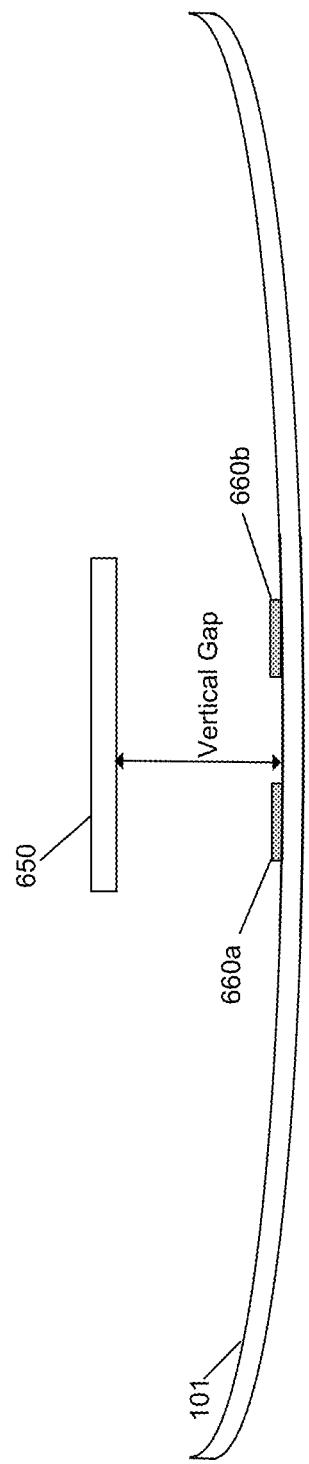

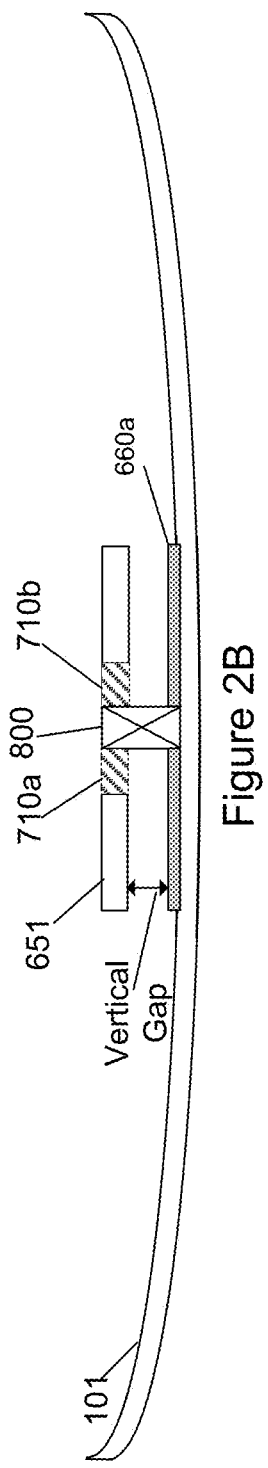

MICROMACHINED GYROSCOPE INCLUDING A GUIDED MASS SYSTEM

CROSS-REFERENCE TO RELATED APPLICATION

This application is a continuation-in-part of U.S. patent application Ser. No. 13/235,296, filed Sep. 16, 2011, entitled "MICROMACHINED GYROSCOPE INCLUDING A GUIDED MASS SYSTEM," which is incorporated herein by reference in its entirety.

FIELD OF THE INVENTION

The present invention relates generally to angular velocity sensors and more particularly relates to angular velocity sensors that include guided mass systems.

BACKGROUND

Sensing of angular velocity is frequently performed using vibratory rate gyroscopes. Vibratory rate gyroscopes broadly function by driving the sensor into a first motion and measuring a second motion of the sensor that is responsive to both the first motion and the angular velocity to be sensed.

Frequently, a mass, usually referred to as a proof mass, within the sensor is driven into oscillation by an actuator. Rotation of the sensor imparts a Coriolis force to the oscillating mass that is proportional to the angular velocity (or rotation rate), and depends on the orientation of the angular velocity vector with respect to the velocity vector of the proof mass. The Coriolis force, the angular velocity vector, and the proof-mass velocity vector are mutually orthogonal. For example, a proof-mass moving in an X-direction within a sensor rotating about a Y-axis, experiences a Z directed Coriolis force. Similarly, a proof-mass moving in an X-direction within a sensor rotating about a Z-axis, experiences a Y directed Coriolis force. Finally, a proof-mass moving in an X-direction within a sensor rotating about the X-axis experiences no Coriolis force. Coriolis forces imparted to the proof-mass are usually sensed indirectly by measuring motions within the sensor that are responsive to the Coriolis forces.

Conventional gyroscopes that sense angular velocity about an in-plane axis (i.e. X-axis or Y-axis) can be driven out-of-plane, and the Coriolis response is sensed in-plane or vice versa. Out-of-plane drive tends to be less efficient than in-plane drive, requires additional fabrication steps, and is limited by nonlinearities. For example, driving the proof-mass out-of-plane might require a large vertical gap or a cavity underneath the proof-mass to provide sufficient room for the proof-mass to oscillate. Forming a cavity under the proof-mass requires additional fabrication steps, thus increases cost. Typically electrostatic actuators of the parallel-plate type are used to drive the proof-mass out-of-plane. The actuators are formed between the proof-mass and the substrate. The electrostatic force depends on the gap between the proof-mass and the substrate. Because the proof-mass oscillates out-of-plane, the electrostatic force is nonlinear which tends to limit the device performance. Additionally, the electrostatic force is reduced because of the requirement to have large vertical gaps or a cavity under the proof-mass. Achieving large amplitude oscillation requires large force and that might require high-voltage actuation. Adding high-voltage actuation increases the fabrication cost and complexity of the integrated circuits.

Furthermore a conventional multi-axis gyroscope might use multiple structures that oscillate at independent frequencies to sense angular rates. Each structure requires a separate drive circuit to oscillate the respective proof-masses. Having more than one drive circuit increases cost and power consumption.

Accordingly, what is desired is to provide a system and method that overcomes the above issues. The present invention addresses such a need.

SUMMARY

A gyroscope comprises a substrate and a guided mass system. The guided mass system comprises a first proof mass, a second proof-mass, and a guiding arm. The first proof-mass, the second proof-mass and the guiding arm are disposed in a plane parallel to the substrate. The first proof mass is coupled to the guiding arm through a first spring; the second proof-mass is coupled to the first proof-mass through a second spring. The guiding arm is coupled to the substrate through a third spring. The second proof-mass is coupled to the substrate by an anchor and a spring system. The gyroscope also comprises an actuator for vibrating the first proof-mass in a first direction, which causes the second proof-mass to rotate in the plane. Finally, the gyroscope comprises at least one transducer for sensing motion of a portion of the guided mass system in the out of the plane direction in response to angular velocity about a first input axis that is in the plane.

BRIEF DESCRIPTION OF THE DRAWINGS

FIG. 1B shows a cross-section of a proof mass of the single-axis gyroscope of FIG. 1A along the X-axis.

FIG. 1C illustrates the shape of the substrate and the proof-mass when external loads applied to the single-axis gyroscope of FIG. 1A.

FIG. 2B illustrates the gyroscope of FIG. 2A when the substrate is warped.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
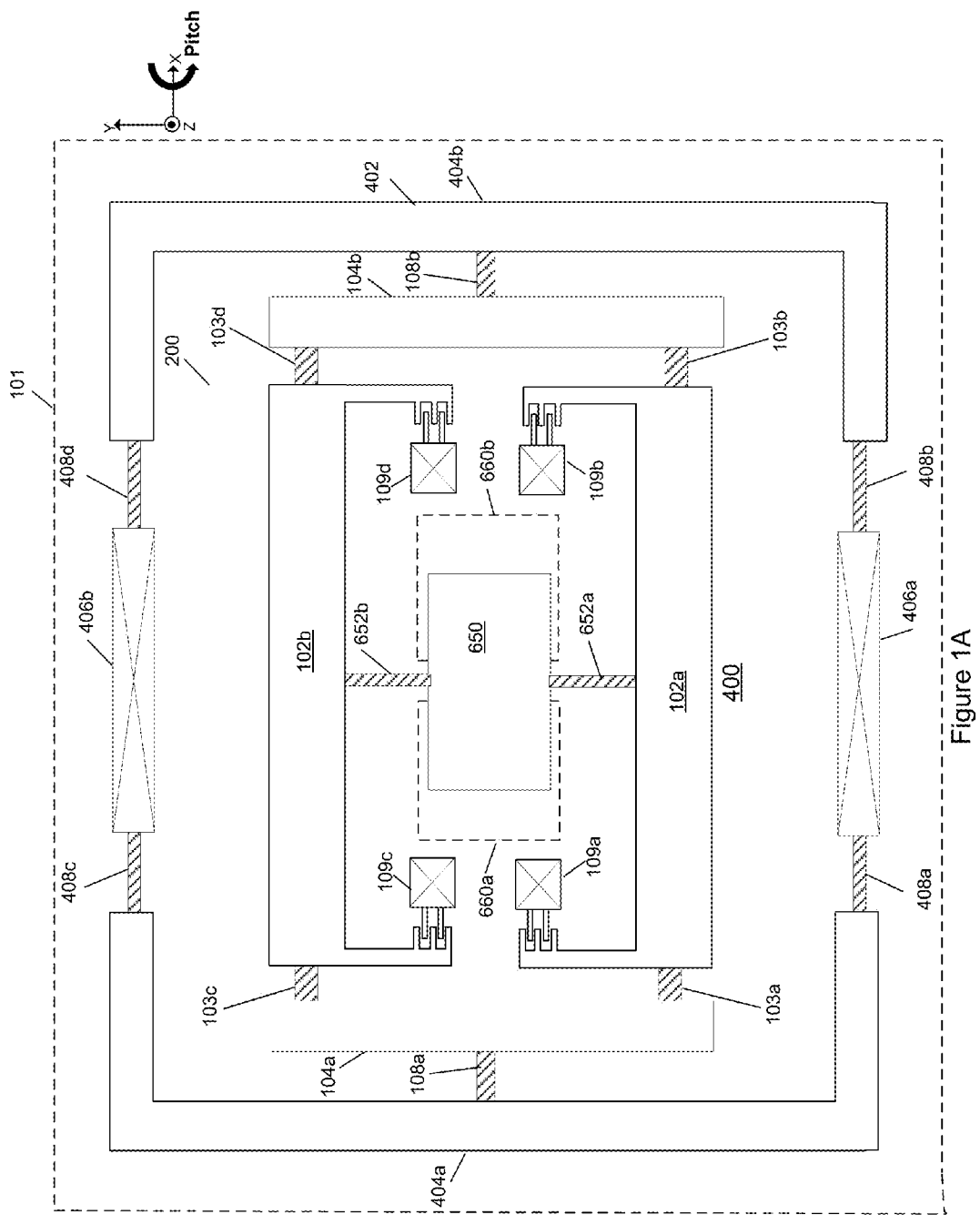
FIG. 1A illustrates an embodiment of a single-axis gyroscope comprising a guided mass system surrounded by a stress relief frame.

FIG. 1A illustrates a single-axis gyroscope comprising a guided mass system 400 surrounded by a stress relief frame 402 in accordance with an embodiment. Gyroscope 400 is described in U.S. patent application Ser. No. 13/235,296 (IVS-147/5007P), filed Sep. 16, 2011, entitled "MICROMACHINED GYROSCOPE INCLUDING A GUIDED MASS SYSTEM", which is incorporated by reference in its entirety. The guided mass system 400 comprises a symmetric guided mass system 200 coupled to a pitch proof-mass 650. The stress relief frame 402 is connected to the guiding arms 104a and 104b via springs 108a and 108b and surrounds the symmetric guided mass system 200. The stress relief frame 402 includes two stress relief frame members 404a and 404b which are coupled to the anchors 406a and 406b respectively via stress relief springs 408a-d. Anchors 406a and 406b are attached to substrate 101. The stress relief members 404a and 404b can also be flexible.

In an embodiment, symmetric guided mass system 200 includes guiding arms 104a and 104b. Two guiding arms 104a and 104b are flexibly coupled to proof-mass 102a and proof-mass 102b via springs 103a-b and 103c-d, respectively. The guiding arms 104a and 104b, proof masses 102a and 102b, and coupling springs 103a-d form a planar four-bar linkage.

In an embodiment, symmetric guided mass system 200 can be driven at a frequency by a drive circuit coupled to the actuators 109a-d. In the described embodiments, the drive circuit can be a single drive circuit or multiple drive circuits. When the guided mass system 200 is driven, each spring 103a, 103b, 103c, 103d, 108a, and 108b bend in-plane and act like a pivot point for the rotation of the four-bar linkage so that each guiding arm 104a and 104b can rotate in-plane about different axes in the Z-direction and proof masses 102a and 102b translate anti-phase along the X-direction. In the present specification, anti-phase means in opposing directions, and in-phase means in the same direction.

Pitch proof-mass 650 is flexibly connected to the two proof-masses 102a and 102b via springs 652a and 652b. Springs 652a and 652b are torsionally compliant such that pitch proof-mass 650 can rotate out-of-plane about a pitch sense axis in the Y-direction. Springs 652a and 652b are compliant in-plane such that when proof-masses 102a and 102b are driven anti-phase in the X-direction; the pitch proof-mass 650 rotates in-plane about an axis in the Z-direction. A combination of the anti-phase motion of proof-masses 102a-b and the in-plane rotation of the pitch proof-mass 650 about Z axis is referred to as drive motion. Although pitch proof mass 650 is shown as a single mass in FIG. 1A, in other embodiments, proof mass 650 may include many masses and plates that are connected to each other via flexible elements. In other words, proof mass 650 can comprise a combination of mass-spring system that is connected to proof masses 102a and 102b via springs 652a and 652b.

Anchors 406a and 406b might experience motion such as translation, expansion, or shearing as a result of thermal stress, packaging stress, or other externally applied stresses. Anchor motion can cause stress, such as tension, on the symmetric guided mass system, resulting in errors such as changing stiffness and resonant frequencies; anchor motion can also cause unwanted motion of the symmetric guided mass system resulting in errors. The stress-relief frame 402 reduces stresses and unwanted motion of the symmetric guided mass system 200. Moreover, the stress relief frame 402 does not move in the drive motion. As a result, the stresses that are applied to frame are not transferred to the springs that affect drive motion.

Angular velocity about the pitch-input axis will cause Coriolis forces to act on the pitch proof-mass 650 resulting in a torque that rotates the pitch proof-mass 650 about Y-axis. The amplitude of the rotation of the pitch proof-mass 650 is proportional to the angular velocity about the pitch-input axis. In an embodiment, electrodes 660a and 660b are disposed on the substrate on the opposite sides along the X-direction under pitch proof-mass 650. In an embodiment, electrodes 660a-b are capacitive transducers for detecting the rotation of the pitch proof-mass about the Y-axis. The rotation of the pitch proof mass 650 provides a measure of the angular velocity about the pitch-input axis. In other embodiments, the transducer can be piezoelectric, optical, or other types and its use would be within the spirit and scope of the present invention.

The transducer sensitivity is the amount of capacitance change due to the change in the angular velocity input. The transducer sensitivity to the angular velocity of pitch proof-mass 650 depends on a nominal capacitance between pitch proof-mass 650 and electrodes 660a-b. In an embodiment, the nominal capacitance is proportional to the overlap area between pitch proof mass 650 and electrodes 660a and 660b and inversely proportional to the gap between proof mass 650 and electrodes 660a-b. The gap between proof mass 650 and electrodes 660a-b is called the vertical gap. The vertical gap is illustrated in FIG. 1B which shows a cross-section of proof mass 650 along X-axis. The vertical gap between pitch proof mass 650 and electrodes 660a-b is one of the main factors that affects the transducer sensitivity of the gyroscope.

Although the gyroscope of FIG. 1A work effectively in a variety of environments, variation of the vertical gap during the regular operation of the gyroscope results in transducer sensitivity variations, which can lead to erroneous results in the final output. Variation of the vertical gap may be caused by the external effects like temperature changes or external loads acting on the gyroscope. Temperature changes can lead to warping of the substrate due to coefficient of thermal expansion (CTE) mismatch of the substrate and materials used for packaging and assembly. Similarly, external loads applied to the gyroscope can lead to warping of substrate 101 (See FIG. 1C). If the gyroscope doesn't warp as much as the substrate, the vertical gap between pitch proof mass 650 and electrodes 660a-b changes. Consequently, the vertical gap variation leads to the variation of the transducer sensitivity and results in erroneous measurements of the gyroscope by the environmental effects. The severity of erroneous results due to the environmental effects depends on the amount of the variation of the vertical gap.

Figure 2A:
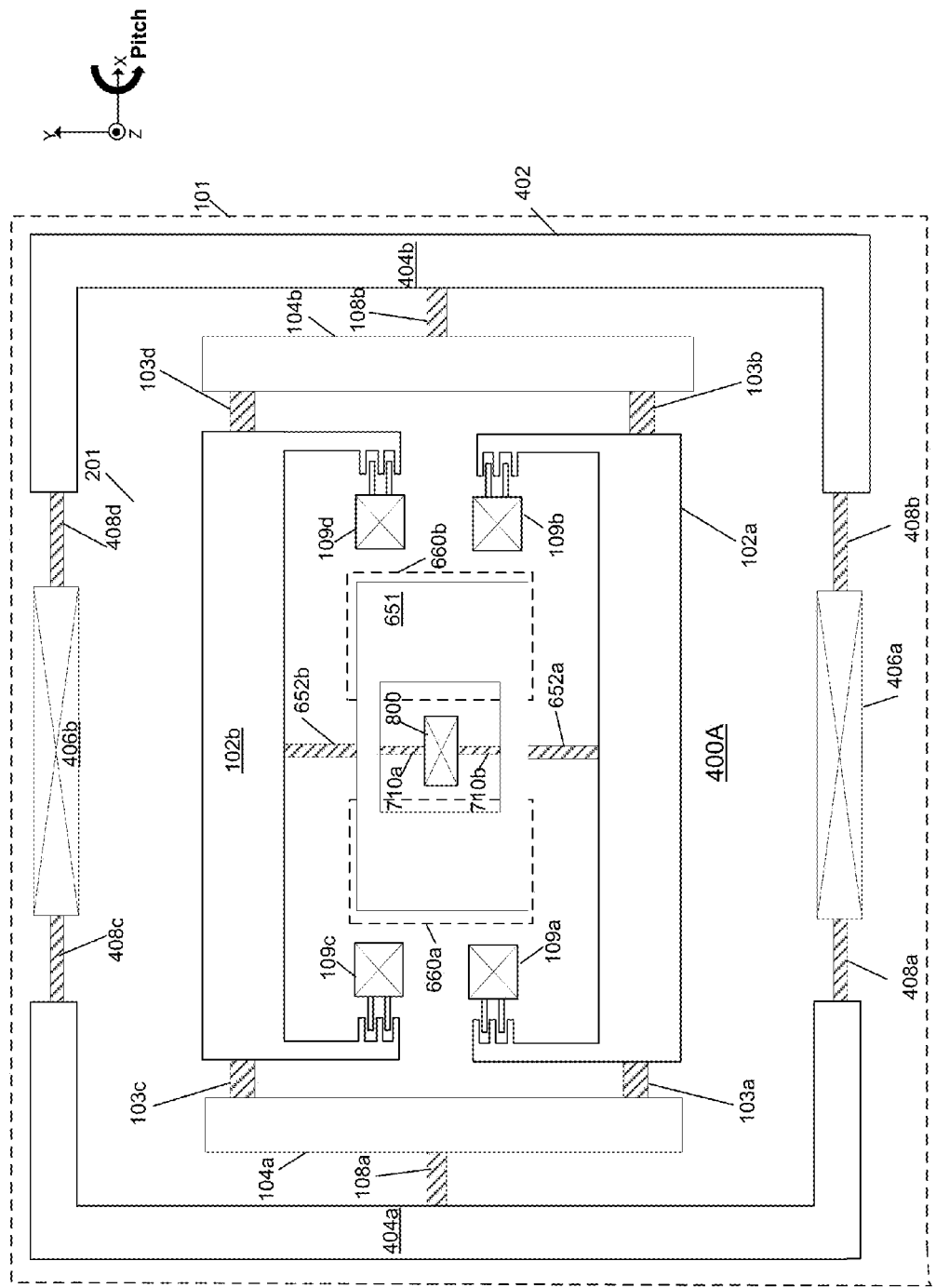
FIG. 2A illustrates an embodiment of a first single-axis gyroscope configuration in accordance with the present invention.

An embodiment of a single-axis gyroscope configuration is shown in FIG. 2A. FIG. 2A includes all the features of FIG. 1A except for pitch proof mass 650. Pitch proof-mass 651 is connected to the substrate 101 via anchor 800 through springs 710a-b. Springs 710a-b are compliant to the in-plane rotations about Z-axis and out-of plane torsional rotation about the Y-axis of pitch proof-mass 651. On the other hand, springs 710a-b are very stiff to the out-of plane translations (Z direction translation). As a result, any out-of plane motion or the warping of substrate 101 can be transferred to pitch proof-mass 651 via anchor 800 through springs 710a-b.

An embodiment of the cross-section along the Y-axis of the warped substrate 101 is shown in FIG. 2B. As it can be seen in FIG. 2B, pitch proof mass 651 follows the motion of the substrate 101 due to the connection through anchor 800 and springs 710a-b. Hence, the pitch proof-mass 651 can follow substantially the same amount of vertical deflection as the substrate under the external loads or temperature variations. Consequently, the vertical gap between the electrodes 660a-b and the pitch proof-mass 651 remains same and the variation of the angular velocity sensitivity of the single-axis gyroscope due to external effects is eliminated.

Figure 3:
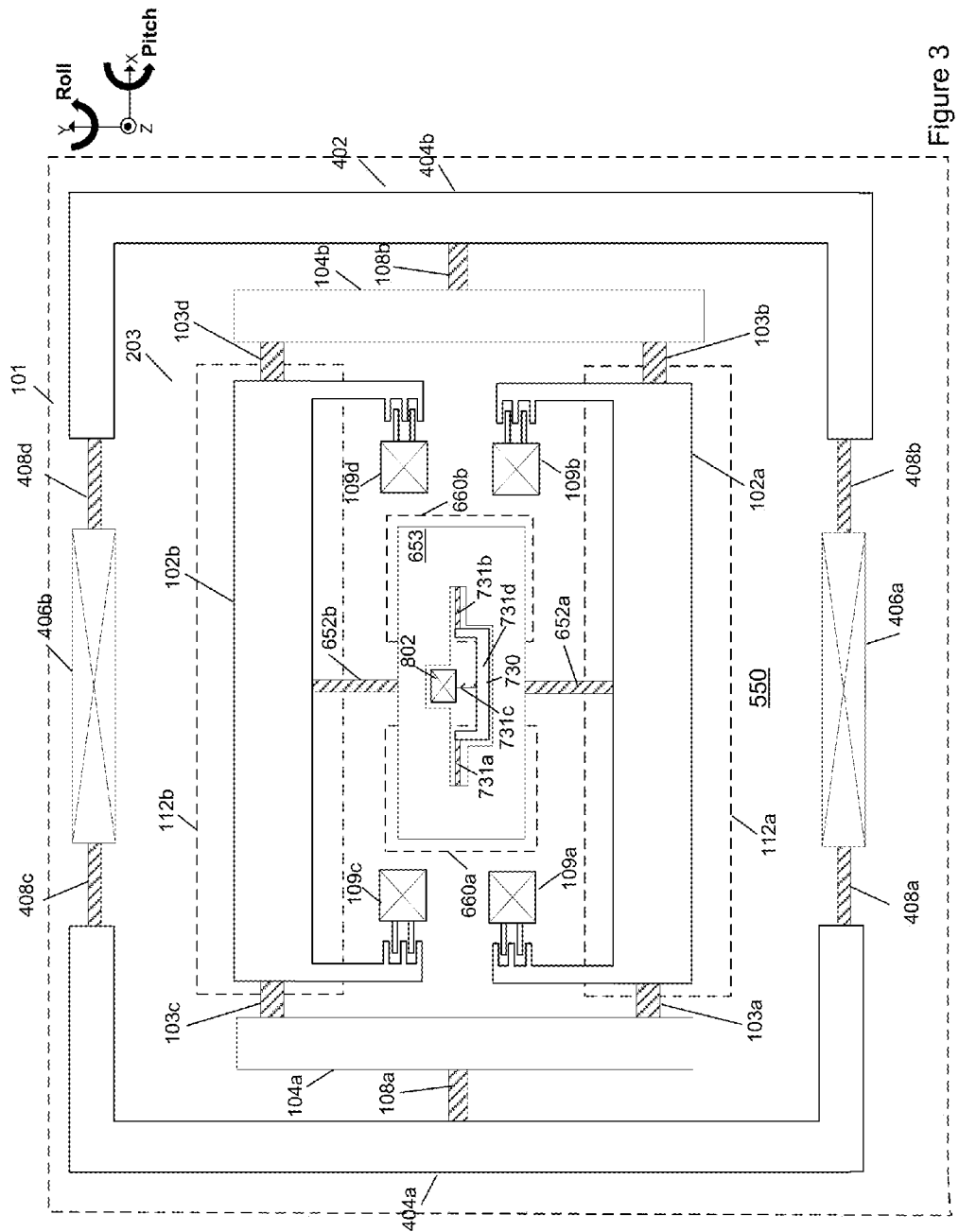
FIG. 3 illustrates a modification of the single-axis gyroscope, shown in FIG. 2A, to implement a dual-axis gyroscope. In this embodiment proof mass is coupled to the substrate via spring system.

FIG. 3 illustrates a modification of the single-axis gyroscope 400A, shown in FIG. 2A, to implement a dual-axis gyroscope 550. In this embodiment pitch proof-mass 653 is coupled to the substrate 101 via spring system 730. Spring system 730 comprises three flexible elements 731a-c and one rigid element 731d. Rigid element 731d is connected to the anchor 802 via the flexible element 731c, and rigid element 731d is connected to the pitch proof-mass 653 via the springs 731a-b. Rigid element 731d is used to place the springs 731a-b away from the center of rotation of the pitch-proof mass 653. As a result, springs 731a-b are stiff enough so that their bending is minimized in the drive motion and they move with pitch proof-mass 653. Moreover, springs 731a-b are torsionally compliant around the X-axis and very stiff in all other directions which allows pitch proof-mass 653, roll proof-masses 102a-b and guiding arms 104a-b to rotate about X-axis.

Spring 731c is compliant to bend in-plane acting like a pivot point for the rotation of proof mass 653 about Z-axis. Spring 731c is also torsionally compliant around the Y-axis. Similar to the implementation given in FIG. 2A, pitch proof-mass 653 follows the motion of substrate 101 and the vertical gap remains same even under the external effects like temperature variations and externally applied forces, since it is connected to the substrate 101 via anchor 802 through spring system 730 which is stiff in the out of plane direction.

Pitch proof mass 653 can be torsionally rotated out-of plane around both X and Y axis due to the compliance of the spring system 730. As a result, the dual-axis gyroscope can respond not only to the angular velocities about the pitch-input axis but also to the angular velocities around the roll-input axis.

The symmetric guided mass system 203 can be driven at a frequency by a drive circuit coupled to the actuators 109a-d. When the guided mass system 203 is driven, each of the guiding arms 104a and 104b rotates in-plane about different axes in the Z-direction, the roll proof-masses 102a and 102b translate anti-phase along the X-direction and proof-mass 653 rotates about Z-axis. Angular velocity about the roll-input axis will cause Coriolis forces to act on the roll proof-masses 102a and 102b anti-phase in the Z-direction.

The Coriolis forces cause the guided mass system 203 to rotate out-of-plane about the X-axis. When the guided mass system 203 rotates out-of-plane, the guiding arms 104a and 104b rotate about the X-axis, and the roll proof-masses 102a and 102b are constrained to move anti-phase out-of-plane by the guiding arms 104a and 104b. Electrodes 112a and 112b which are under the roll proof masses 102a and 102b respectively are used to detect the rotation of the guided mass system 200 about the first roll-sense axis. This rotation provides a measure of the angular velocity about the roll-input axis.

The detection mechanism of the angular velocity around the pitch sense axis is same as the given configuration in FIG. 2A. Angular velocity about the pitch-input axis will cause Coriolis forces to act on the pitch proof-mass 653 resulting in a torque that rotates the pitch proof-mass 653 about Y-axis because spring 731c is torsionally compliant around the Y-axis. The amplitude of the rotation of the pitch proof-mass 653 is proportional to the angular velocity about the pitch-input axis. Electrodes 660a and 660b are disposed on the substrate on the opposite sides along the X-direction under the pitch proof-mass 653 and detect the rotation of the pitch proof-mass about the Y-axis.

Figure 4A:
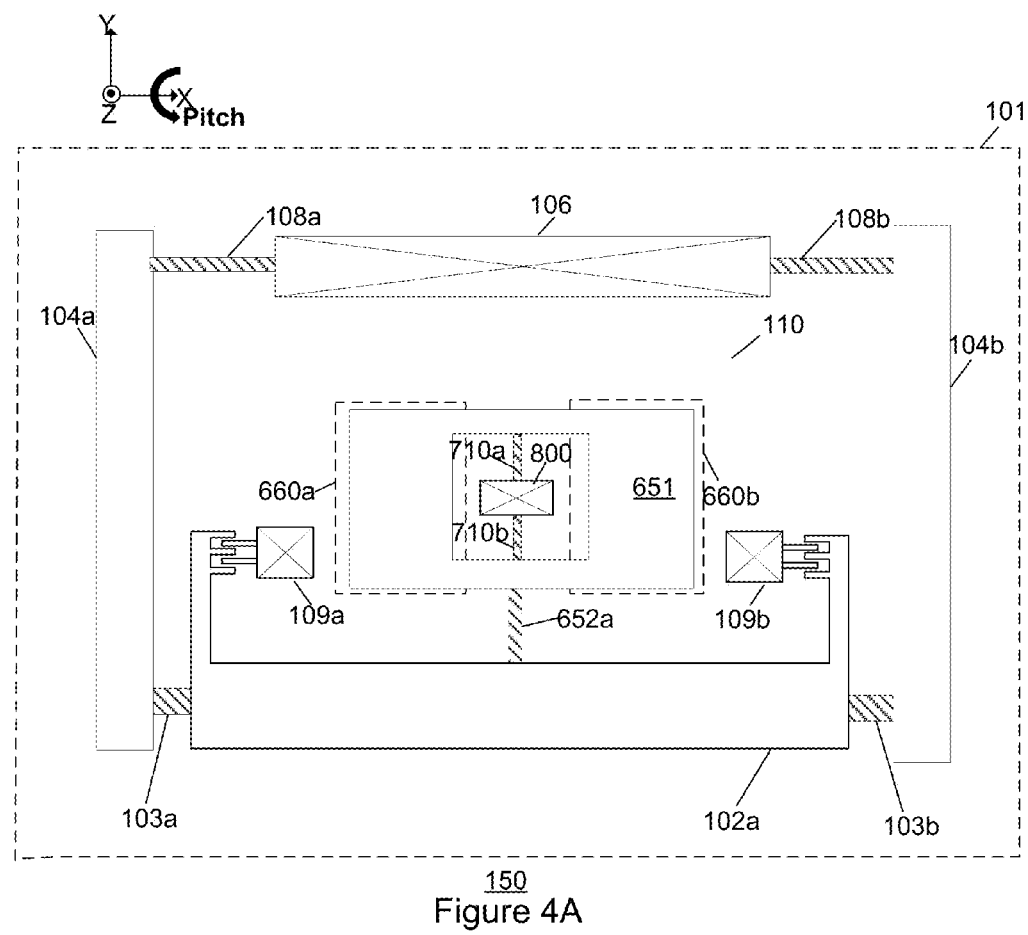
FIG. 4A illustrates an embodiment of a single-axis pitch gyroscope comprising a guided mass system in accordance with the present invention.

FIG. 4A illustrates an embodiment of a single-axis pitch gyroscope comprising guided mass system 150 in accordance with the present invention. The guided mass system 150 includes guiding arms 104a and 104b that are flexibly coupled to the substrate 101 via at least one anchoring point 106 with the springs 108a and 108b. The two guiding arms 104a and 104b are flexibly coupled to one proof-mass 102a via springs 103a and 103b.

The proof-mass 102a, guiding arms 104a and 104b, anchoring point 106, and springs 103a, 103b, 108a, and 108b form a planar four-bar linkage. Each spring 103a, 103b, 108a, and 108b bend in-plane and act like pivot point for the rotation of the four-bar linkage so that each guiding arm 104a and 104b can rotate in-plane about different axes in the Z-direction while proof-mass 102a translates in an X-direction.

Guided mass system 150 also comprises a pitch proof-mass 651. The pitch proof-mass 651 is flexibly coupled to the proof-mass 102a via spring 652a and it is connected to the substrate 101 via an anchor 800 through springs 710a-b. Spring 652a and springs 710a-b are compliant in-plane such that when the proof mass 102a is driven in the X-direction via the electrostatic force applied by the comb fingers 109a-b; the pitch proof-mass 651 rotates in-plane about an axis in the Z-direction in the drive mode.

Springs 710a-b are also compliant for the out-of plane rotation of the pitch proof-mass about Y-axis. On the other hand, springs 710a-b are very stiff to the out-of plane translations (Z direction translation). As a result, any out-of plane motion or the warping of the substrate 101 can be transferred to pitch proof-mass 651 via anchor 800 through springs 710a-b. Hence, the pitch proof-mass 651 can follow the same amount of vertical deflection as the substrate under the external loads or temperature variations which reduces variation of the vertical gap.

Angular velocity about the pitch-input axis will cause Coriolis forces to act on the pitch proof-mass 651 resulting in a torque that rotates the pitch proof-mass 651 about the pitch-sense axis which is orthogonal to the pitch input axis. The amplitude of the rotation of the pitch proof-mass 651 is proportional to the angular velocity about the pitch-input axis. Electrodes 660a and 660b are disposed on the substrate on the opposite sides along the X-direction under the pitch proof-mass 651 and detect the rotation of the pitch proof-mass about the Y-axis. Rotation about the Y-axis provides a measure of the angular velocity about the pitch-input axis.

Figure 4B:
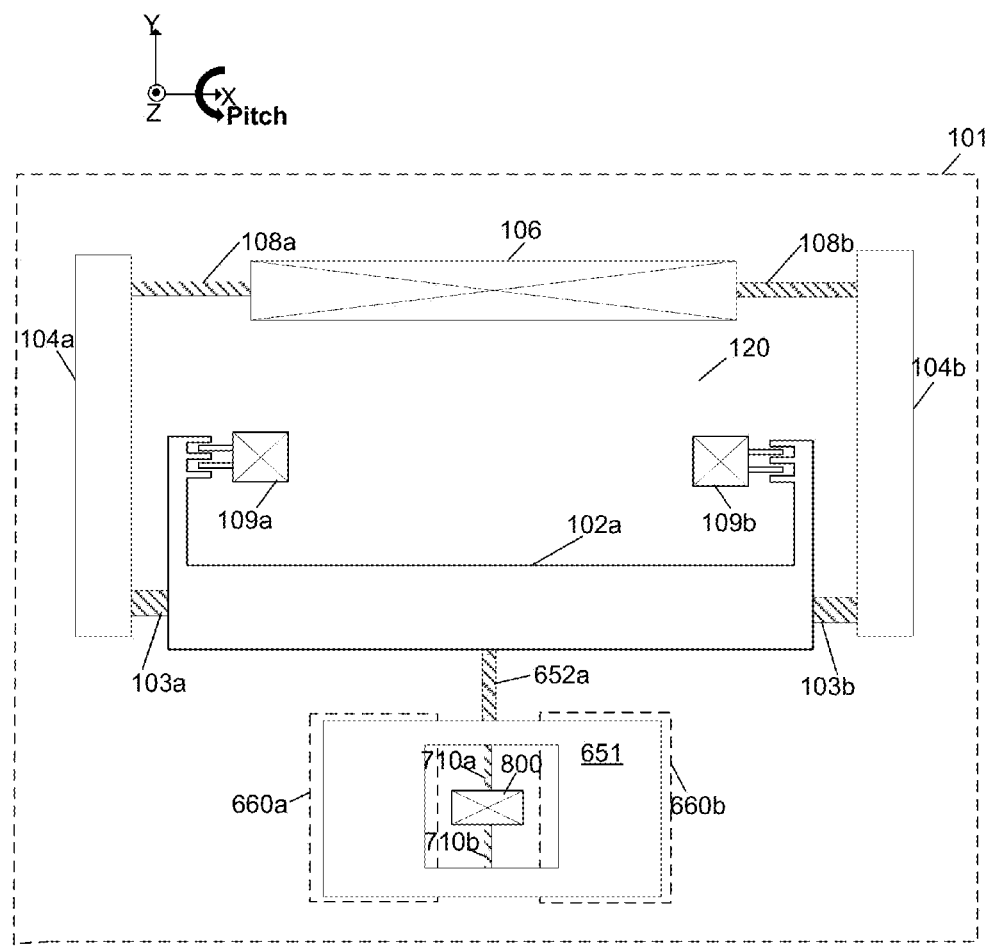
FIG. 4B shows a different embodiment of the single axis gyroscope given in FIG. 4A.

FIG. 4B shows a different embodiment of the single axis gyroscope given in FIG. 4A. In FIG. 4B, the proof mass 651 is placed outside of the four bar linkage defined by the proof-mass 102a, guiding arms 104a and 104b, anchoring point 106, and springs 103a, 103b, 108a, and 108b. The embodiment given in FIG. 4B can be used if the area surrounded by the four bar linkage is limited or for any other design purposes, such as an additional proof-mass for sensing angular velocity about the yaw-axis or additional drive electrodes.

Figure 5:
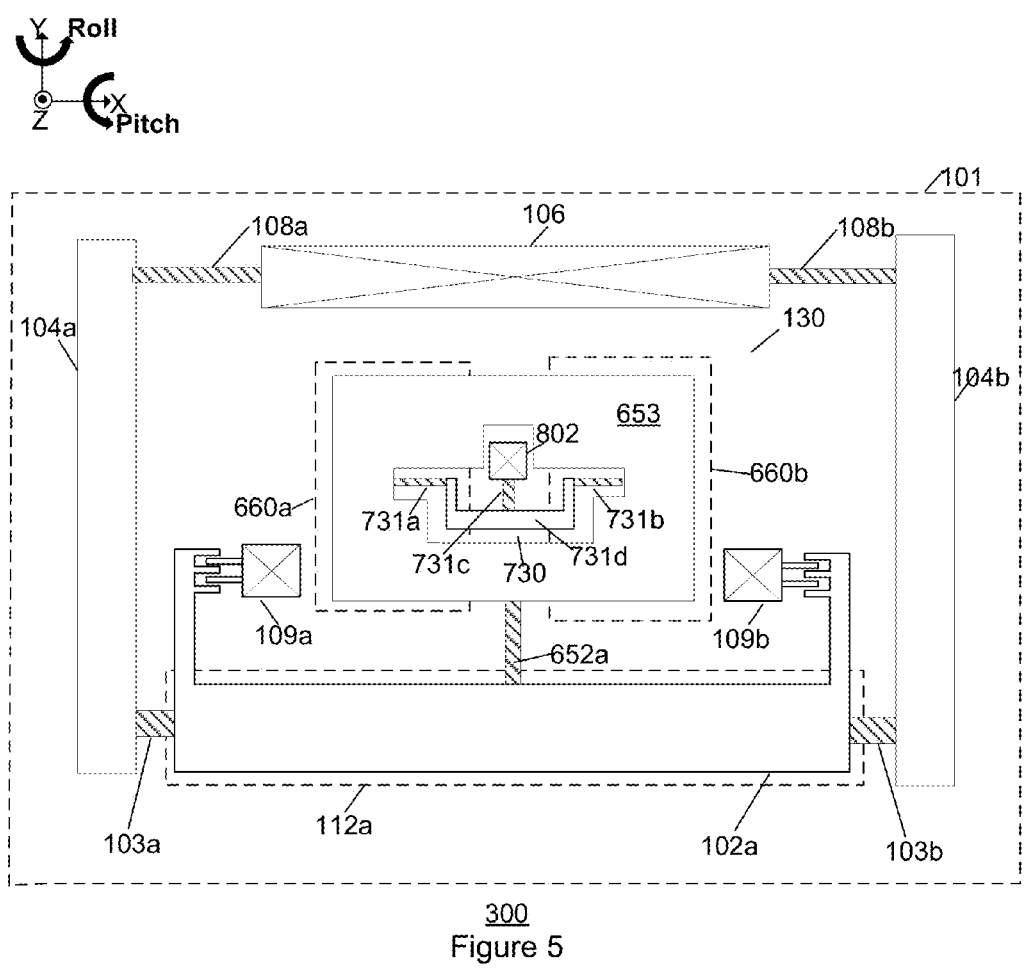
FIG. 5 illustrates a modification of the single-axis gyroscope shown in FIG. 4A to implement a dual-axis gyroscope.

FIG. 5 illustrates an embodiment of a modification of the single-axis gyroscope shown in FIG. 4A to implement a dual-axis gyroscope. In this embodiment, proof mass 653 is coupled to substrate 101 via spring system 730. Spring system 730 comprises three flexible elements 731a-c and one rigid element 731d. Rigid element 731d is connected to the anchor 802 via flexible element 731c, and rigid element 731d is connected to the pitch proof-mass 653 via the springs 731a-b.

Springs 731a-b are torsionally compliant around the X-axis and very stiff in all other directions which allows pitch proof-mass 653, roll proof-mass 102a and guiding arms 104a-b to rotate about X-axis. Spring 731c is compliant to bend in-plane acting like a pivot point for the rotation of proof mass 653 about Z-axis. Spring 731c is also torsionally compliant around the Y-axis.

Similar to the implementation given in FIG. 2A, pitch proof-mass 653 follows the motion of the substrate and the vertical gap remains same even under the external effects like temperature variations and external loading, since it is connected to the substrate via the anchor 802 through the spring system 730 which is stiff in the out of plane direction.

The pitch proof mass 653 given in FIG. 5 can be torsionally rotated out-of plane around both X and Y axes by the help of the spring system 730. As a result, the dual-axis gyroscope can respond not only to the angular velocities about the pitch-input axis but also to the angular velocities around the roll-input axis.

In an embodiment, guided mass system 300 can be driven at a frequency by a drive circuit coupled to actuators 109a-b. When guided mass system 300 is driven, each of guiding arms 104a and 104b rotates in-plane about different axes in the Z-direction, roll proof-mass 102a translate along the X-direction, and proof-mass 653 rotates about Z-axis. Angular velocity about the roll-input axis will cause Coriolis forces to act on roll proof-mass 102a in the Z-direction. The Coriolis forces cause guided mass system 300 to rotate out-of-plane about the X-axis. When guided mass system 300 rotates out-of-plane, guiding arms 104a and 104b rotate about the X-axis, and roll proof-mass 102a is constrained to move out-of-plane by guiding arms 104a and 104b. Electrodes 112a under roll proof mass 102a is used to detect the rotation of guided mass system 300 about the first roll-sense axis. This rotation provides a measure of the angular velocity about the roll-input axis.

The detection mechanism of the angular velocity of guided mass system 300 around the pitch sense axis is same as the given configuration in FIG. 4A. Angular velocity about the pitch-input axis will cause Coriolis forces to act on the pitch proof-mass 653 resulting in a torque that rotates the pitch proof-mass 653 about Y-axis because spring 731c is torsionally compliant around the Y-axis. The amplitude of the rotation of the pitch proof-mass 653 is proportional to the angular velocity about the pitch-input axis. Electrodes 660a and 660b are disposed on the substrate on the opposite sides along the X-direction under the pitch proof-mass 650 and detect the rotation of the pitch proof-mass about the Y-axis.

Figure 6:
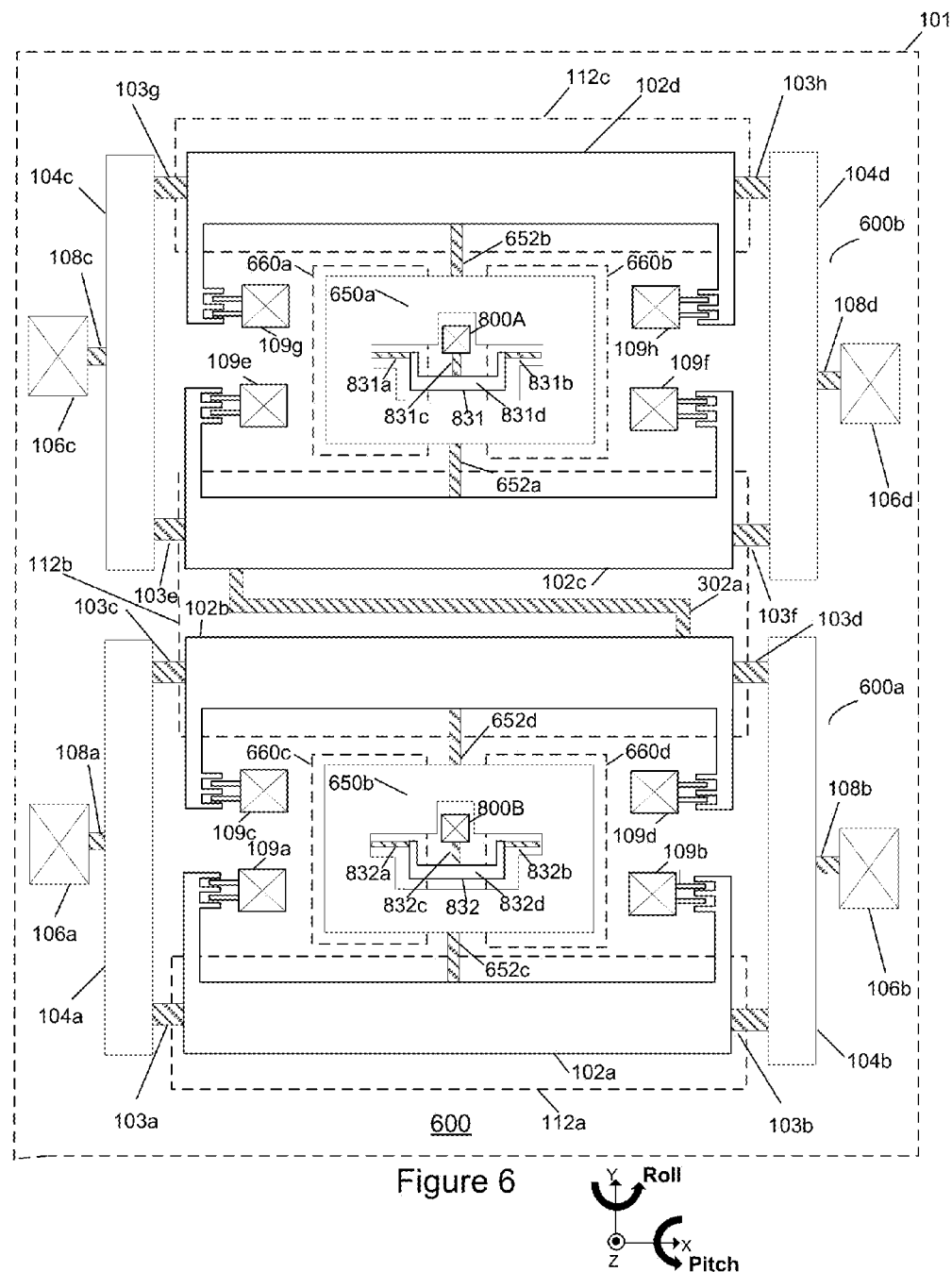
FIG. 6 illustrates an embodiment of a dual-axis gyroscope comprising a balanced guided mass system in accordance with the present invention.

FIG. 6 illustrates an embodiment of a dual-axis gyroscope comprising a balanced guided mass system 600 in accordance with the present invention. The guided mass system 600 comprises two guided mass systems 600a and 600b coupled together by coupling spring 302a. The guided mass systems 600a and 600b are connected to anchors 106a-d via springs 108a-d.

The symmetric guided mass system 600a rotates out-of-plane about a first roll-sense axis. The symmetric guided mass system 600b rotates out-of-plane about a second roll-sense axis in-plane and parallel to the first roll-sense axis. The coupling spring 302a is connected to roll proof-masses 102b and 102c. The coupling spring 302a is torsionally compliant about an axis in the X-direction so that the symmetric guided mass systems 600a and 600b can rotate anti-phase out-of-plane about the first and second roll-sense axes. The coupling spring 302a is stiff in the Z-direction which prevents the symmetric guided mass systems 600a and 600b from rotating in-phase out-of-plane.

In an embodiment, pitch proof-masses 650a and 650b are each flexibly connected to their respective four roll proof-masses 102a-102d via springs 652a-d. Springs 652a and 652b are torsionally compliant such that pitch proof-mass 650a can rotate out-of-plane about a first pitch sense axis in the Y-direction, and springs 652c and 652d are torsionally compliant such that pitch proof-mass 650b can rotate out-of-plane about a second pitch sense axis in the Y-direction.

In this embodiment proof masses 650a and 650b are also coupled to the substrate via spring systems 831 and 832, respectively. In an embodiment, spring systems 831 and 832 are same as the spring system 730. Similar to the implementation given in FIG. 3, pitch proof-masses 650a and 650b follow the motion of the substrate and the vertical gap between the substrate and the proof masses remain same even under the external effects like temperature variations and externally applied forces.

The two symmetric guided mass systems 600a and 600b are arranged so that the roll proof-masses 102a-d all move in the X-direction. The coupling spring 302a is stiff in the X-direction such that roll proof-masses 102b and 102c move together in the X-direction. The roll proof-masses 102a and 102d move in opposite of roll proof-masses 102b and 102c.

Springs 652a-d are compliant in-plane such that when the roll proof-masses 102a-d are driven, the pitch proof-masses 650a and 650b rotate anti-phase in-plane about separate axes in the Z-direction. Electrostatic actuators 109a-h such as comb drives, are connected to the roll proof-masses 102a-d to drive the balanced guided mass system 600. The two guided mass systems 600a and 600b comprising roll proof-masses 102a-d and pitch proof-masses 650a and 650b are driven together at a frequency by a drive circuit coupled to the actuators 109a-h.

Angular velocity about the pitch-input axis in the X-direction will cause Coriolis forces to act on the pitch proof-masses 650a and 650b about the first and second pitch-sense axes respectively. The Coriolis forces cause the pitch proof masses 650a and 650b to rotate anti-phase out-of-plane about the first and the second pitch-sense axes. The amplitudes of the rotations of the pitch proof-masses 650a and 650b about the first and the second pitch-sense axes are proportional to the angular velocity about the pitch-input axis.

In an embodiment, transducers 660a-660d under the pitch proof masses 650a and 650b are used to detect the anti-phase rotations about the first and the second pitch-sense axes. Externally applied angular acceleration about the roll-input axis will generate inertial torques in-phase on the pitch proof masses 650a and 650b causing them to rotate in-phase about the first and the second pitch-sense axes. Transducers 660a and 660d can be coupled and transducers 660b and 660c can be coupled so that in-phase rotations of the pitch proof-masses 650a and 650b are not detected, but anti-phase rotations are detected.

Angular velocity about the roll-input axis will cause Coriolis forces to act on the roll proof-masses 102a-d in the Z-direction. The Coriolis forces cause the symmetric guided mass systems 600a and 600b to rotate anti-phase out-of-plane about the first and second roll-sense axes. Transducers 112a-c under the roll proof masses 102a-d are used to detect the rotations of the symmetric guided mass systems 600a and 600b. Externally applied angular acceleration about the pitch-input axis will generate in-phase inertial torques on the symmetric guided mass systems 600a and 600b.

However, the symmetric guided mass systems 600a and 600b do not rotate because coupling spring 302a prevents in-phase rotation about the first and second roll-sense axes. Transducers 112a and 112c can be coupled so that in-phase rotations of the symmetric guided mass systems 600a and 600b are not detected but anti-phase rotations are detected.

Figure 7:
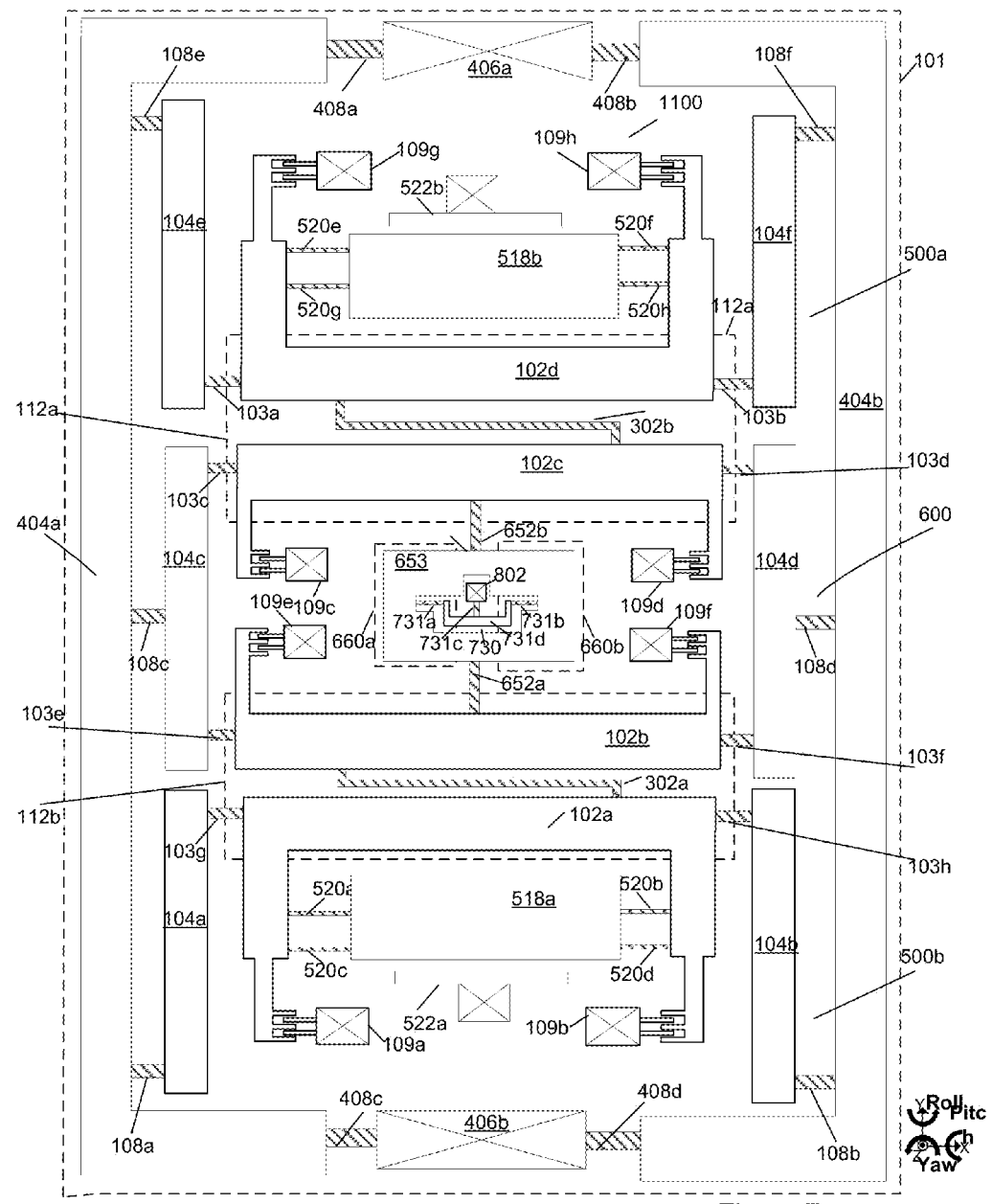
FIG. 7 illustrates an embodiment of a tri-axis gyroscope comprising a multiple guided mass system in accordance with the present invention.

FIG. 7 illustrates an embodiment of a tri-axis gyroscope comprising a multiple guided mass system 1200 in accordance with the present invention. The multiple guided mass system 1200 comprises the multiple guided mass system 1100 coupled to a stress relief frame 402.

The stress relief frame 402 is connected to the guiding arms 104a-f via springs 108a-f respectively and surrounds the multiple guided mass system 1100. The guided mass systems 500a, 500b and 600 are arranged so that when roll proof-masses 102a-d all move in the X-direction, the pitch proof-mass 653 rotates about an axis in the Z-direction, and the yaw proof-masses 518a and 518b move anti-phase in the X-direction. The guided mass systems 500a, 500b, and 600 are driven together at a frequency by a drive circuit coupled to the actuators 109a-h.

In an embodiment, angular velocity about the pitch-input axis causes Coriolis forces to act on the pitch proof-mass 653 resulting in a torque that rotates the pitch proof-mass 653 about the pitch-sense axis. The amplitude of the rotation of the pitch proof-mass 653 is proportional to the angular velocity about the pitch-input axis. Electrodes 660a and 660b are disposed on opposite sides along the X-direction under the pitch proof-mass 653 and detect the rotation of the pitch proof-mass about the pitch-sense axis. The rotation provides a measure of the angular velocity about the pitch-input axis. Similar to the pitch proof mass configuration given in FIG. 5, proof mass 653 connected to the substrate via anchor 802 with the use of spring system 730.

Angular velocity about the roll-input axis causes Coriolis forces to act on the roll proof-masses 102a and 102b in a Z-direction and on roll proof-masses 102c and 102d in the opposite Z-direction. The Coriolis forces cause the guided mass systems 500a, 600, and 500b to rotate out-of-plane about the first, second, and third roll-sense axis respectively. Electrode 112a under the roll proof masses 102a and 102b and electrode 112b under the roll proof masses 102c and 102d are used to detect the rotation of the guided mass system 1100. This rotation provides a measure of the angular velocity about the roll-input axis.

Angular velocity about the yaw-input axis causes Coriolis forces to act on the yaw proof-masses 518a and 518b resulting in motion of the yaw proof-masses 518a and 518b anti-phase along the Y-direction. The amplitude of the motion of the yaw proof-masses along the Y-direction is proportional to the angular velocity. Electrodes 522a and 522b are used to sense the motion of the respective yaw proof masses 518a and 518b along the Y-direction.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A gyroscope comprising;
a substrate;
a guided mass system, the guided mass system comprising at least one first proof-mass, at least one second proof-mass, and at least one guiding arm;
wherein the at least one first proof-mass, the at least one second proof-mass and at least one guiding arm are disposed in a plane parallel to the substrate;
wherein the at least one first proof mass is coupled to the at least one guiding arm through at least one first spring;
wherein the at least one second proof-mass is coupled to the at least one first proof-mass through at least one second spring;
wherein the at least one guiding arm is coupled to the substrate through at least one third spring;
wherein the at least one second proof-mass is coupled to the substrate through at least one fourth spring;
an actuator that causes the at least one first proof-mass to vibrate in a first direction and causes the at least one second proof-mass and the at least one guiding arm to rotate in the plane; and
at least one transducer for sensing motion of a portion of the guided mass system out of the plane in response to angular velocity about a first input axis that is in the plane.

2. The gyroscope of claim 1, wherein the at least one guiding arm and the at least one second proof-mass are coupled to the substrate by an anchor.

3. The gyroscope of claim 1, wherein the at least one second proof mass and the at least one guiding arm rotate in a same direction.

4. The gyroscope of claim 1, where in the at least one second proof-mass and the at least one guiding arm rotate in opposite directions.

5. The gyroscope of claim 1, wherein the at least one transducer senses motion of the at least one second proof-mass out of the plane in response to angular velocity about an input axis that is parallel to the first direction.

6. The gyroscope of claim 1, wherein the at least one guiding arm and the at least one first proof-mass are able to rotate out of the plane about a first sense axis, the first sense axis being in the plane and parallel to the first direction.

7. The gyroscope of claim 1, wherein the at least one transducer senses motion of the at least one first proof mass out of the plane in response to the angular velocity about the first input axis; the first input axis is in the plane and orthogonal to the first direction.

8. The gyroscope of claim 1, wherein the at least one fourth spring is compliant in the plane allowing rotation in the plane and compliant out of the plane allowing rotation around a second sense axis wherein the second sense axis is in the plane and orthogonal to the first direction.

9. The gyroscope of claim 8, wherein the at least one second proof-mass is connected to at least one fifth spring, wherein the at least one fifth spring is connected to at least one rigid element, wherein the at least one rigid element is connected to the fourth spring; wherein the at least one fifth spring is compliant about a first sense axis.

10. The gyroscope of claim 8, further comprising a second transducer; wherein the second transducer senses motion of the at least one second proof-mass out of the plane in response to angular velocity about an input axis that is parallel to the first direction.

11. A gyroscope comprising:
a substrate;
a guided mass system, the guided mass system comprising at least one first proof-mass, at least one second proof-mass, at least one center proof-mass, and at least one guiding arm,
wherein the at least one first proof-mass, the at least one second proof-mass, the at least one center proof-mass, and the at least one guiding arm are disposed in a plane parallel to the substrate,
the at least one first proof-mass is coupled to the at least one guiding arm through at least one first spring and the at least one second proof-mass is coupled to the at least one guiding arm through at least one second spring;

the at least one center proof-mass is coupled to the at least one first proof-mass through at least one third spring and the at least one center proof-mass is coupled to the at least one second proof-mass through at least one fourth spring;

the at least one guiding arm is coupled to the substrate through at least one fifth spring;

the at least one center proof-mass is coupled to the substrate by at least one anchor through at least one sixth spring;

wherein the at least one guiding arm allows anti-phase motion of the at least one first proof-mass and the at least one second proof-mass in a first direction in the plane;

an actuator causes the at least one first proof-mass and the at least one second proof-mass to vibrate anti-phase in the first direction, causes the at least one center proof-mass and at least one guiding arm to rotate in the plane; and at least one transducer for sensing motion of a portion of the guided mass system out of the plane in response to angular velocity about a first input axis that is in the plane.

12. The gyroscope of claim 11 further comprising:
a stress relief frame,
wherein the at least one guiding arm is coupled to the stress relief frame via the at least one fifth spring,
wherein the stress relief frame is coupled to the substrate through an anchor,
wherein the stress relief frame does not vibrate substantially in response to the actuator.

13. The gyroscope of claim 11, wherein the at least one guiding arm, the at least one first proof-mass, and the at least one second proof-mass are able to rotate out of the plane about the first sense axis.

14. The gyroscope of claim 13, wherein the at least one sixth spring is compliant in the plane allowing rotation in the plane and compliant out of the plane allowing rotation around a second sense axis.

15. The gyroscope of claim 11, wherein the at least one center proof-mass is connected to at least one seventh spring, wherein the at least one seventh spring is connected to at least one rigid element, wherein the at least one rigid element is connected to the sixth spring; wherein the at least one seventh spring is compliant about a first sense axis.

16. The gyroscope of claim 11, wherein the at least one transducer senses motion of the at least one first proof-mass out of the plane in response to the angular velocity about the first input axis; the first input axis is in the plane and orthogonal to the first direction.

17. The gyroscope of claim 11, further comprising at least one second transducer wherein the at least one second transducer senses motion of the at least one center proof-mass out of the plane in response to angular velocity about an input axis that is parallel to the first direction.

18. A gyroscope comprising:
a substrate;
first and second guided mass systems;
a connecting spring coupling the first and second guided mass systems,
the first and second guided mass systems each comprise, at least one first proof-mass, at least one second proof-mass, at least one center proof-mass, and at least one guiding arm,
wherein the at least one first proof-mass, the at least one second proof-mass, the at least one center proof-mass, and the at least one guiding arm are disposed parallel to the substrate,
wherein the at least one center proof-mass is coupled to the at least one first proof-mass, and the at least one second proof-mass,
wherein the at least one first proof-mass and the at least one second proof-mass are coupled to the at least one guiding arm,
wherein the at least one center proof-mass is coupled to the substrate and the at least one guiding arm is coupled to the substrate,
wherein the at least one center proof-mass is able to rotate about a sense axis in plane and orthogonal to a first direction,
wherein the at least one guiding arm allows anti-phase motion of the at least one first proof-mass and the at least one second proof-mass in a first direction in the plane;
an actuator for vibrating the first and second guided mass systems, that the at least one first proof-mass and the at least one second proof-mass to move anti-phase along the first direction,
wherein the at least one center proof-mass of the first guided mass system and the at least one center proof-mass of the second guided mass system rotate anti-phase about an axis normal to the plane; and
at least one transducer for sensing motion of a portion of the first and second guided mass systems out of the plane in response to an angular velocity about an input axis that is in the plane.

19. The gyroscope of claim 18, wherein the connecting spring couples the at least one first proof-mass of the first guided mass system and the at least one second proof-mass of the second guided mass system.

20. The gyroscope of claim 18, wherein the at least one first proof-mass of the first guided mass system and the at least one first proof-mass of the second guided mass system have anti-phase motion.

21. The gyroscope of claim 18, wherein the first guided mass system rotates about a first axis, the second guided mass system rotates about a second axis, the first and second guided mass systems rotates anti-phase about the first and second axes, wherein the first and second axes are in the plane and parallel to the first direction.

22. The gyroscope of claim 18, the at least one transducer senses motion of the at least one center proof-mass of the first and second guided mass systems in response to angular velocity about an axis in the plane and parallel to the first direction.

23. The gyroscope of claim 22, further comprising at least one second transducer for sensing motion of the at least one first and second proof-masses of the first and second guided mass systems in response to angular velocity in the plane and orthogonal to the first direction.

24. The gyroscope of claim 18, the at least one center proof-mass of the first guided mass system and the at least one center proof-mass of the second guided mass system rotate anti-phase about their respective sense axis in response to angular velocity about an axis in the plane and parallel the first direction.

25. A gyroscope comprising:
a substrate;
a guided mass system, the guided mass system comprising at least one first and second proof-masses, at least one center proof-mass, and at least one guiding arm, wherein the at least one first, second and center proof-masses, and the at least one guiding arm are disposed parallel to the substrate, wherein the at least one first proof-mass is coupled to the at least one guiding arm, wherein the at least one second proof-mass is coupled to the at least one first proof-mass, wherein the at least one center proof-mass is coupled to the at least one proof-mass and coupled to the substrate, wherein the at least one guiding arm is coupled to the substrate;

an actuator for vibrating the guided mass system, wherein the at least one guiding arm rotates in plane and allows motion of the at least one first and second proof-masses along a first direction in a plane parallel to the substrate, wherein the at least one center proof-mass rotates about an axis normal to the plane, wherein the at least one guiding arm and the at least one first and second proof-masses rotate about a first sense axis in response to the angular velocity about a first input axis that is in the plane and orthogonal to the first direction, the first sense axis being in-plane and parallel to the first direction;

wherein the at least one center proof-mass rotates about an axis in plane and orthogonal to the first direction in response to the angular velocity about the second input axis that is in the plane and parallel to the first direction, wherein the at least one second proof-mass is able to move in-plane in a direction orthogonal to the first direction in response to the angular velocity about a third input axis normal to the plane;

a first transducer for sensing motion of a portion of the at least one first proof-mass in response to the angular velocity about the first input axis;

a second transducer for sensing motion of a portion of the guided mass system in response to the angular velocity about the second input axis; and a third transducer for detecting motion of a portion of the guided mass system in response to the angular velocity about the third input axis.

26. The device of claim 25, the at least one center proof-mass is coupled to the substrate by a lever arm, wherein the actuator causes the lever arm to rotate about an axis orthogonal to the plane, and wherein the lever arm rotates about an axis in the plane and orthogonal to the first direction in response to the angular velocity about the second input axis that is in the plane and parallel to the first direction.

* * * * *